July 19, 1932.   O. A. S. ERIKSEN   1,867,911
TIRE CHAIN HOOK
Filed April 8, 1932
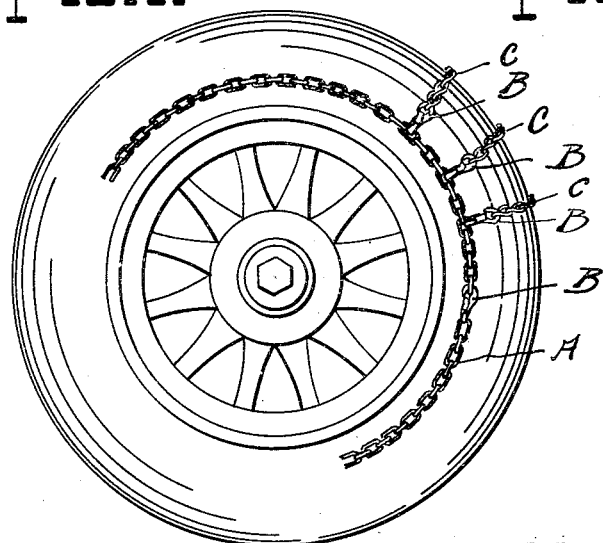
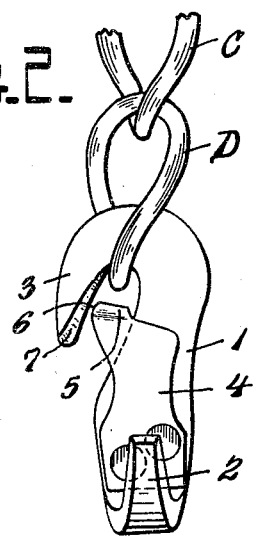
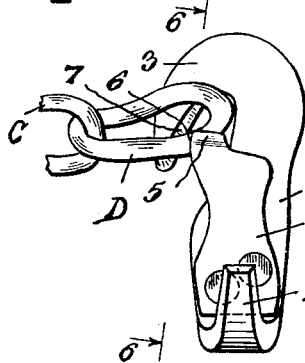
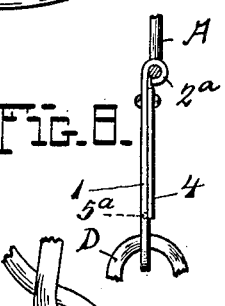
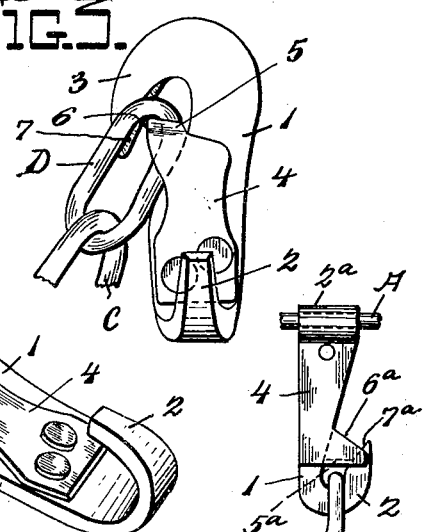
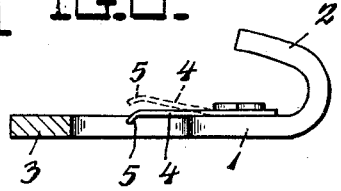
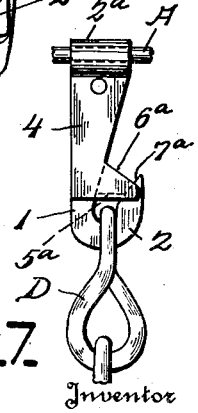
Inventor
OLAF ARNFIN STAM ERIKSEN.
By *Robts Robt*
Attorneys

Patented July 19, 1932

1,867,911

UNITED STATES PATENT OFFICE

OLAF ARNFIN STAM ERIKSEN, OF VESTRE AKER, NORWAY, ASSIGNOR OF ONE-HALF TO AKTIESELSKAPET EUREKA MEKANISKE VERKSTED, OF SKOYEN, NORWAY, A CORPORATION; AND ONE-HALF TO EMIL TRANAAS, OF MILWAUKEE, WISCONSIN

TIRE CHAIN HOOK

Application filed April 8, 1932, Serial No. 604,079, and in Norway January 20, 1931.

In the use of anti-skid chains for automobiles, it is of course desirable that the chains be capable of being applied and removed with a minimum amount of trouble and effort, and to this end many types of attaching instrumentalities therefor have been proposed, which while operating more or less satisfactorily, do not secure the parts of the chain together in a manner combining the extreme simplicity of the present construction hereinafter described, nor in the safe retention of the chain parts against accidental displacement from the fastening devices.

The present invention relates to such a fastening device which takes the form of a hook construction, which is permanently attached at one end in a simple manner to certain of the chain parts, and which is adapted to interlock with the loose ends of adjacent chain parts in such a manner as to secure all of the parts firmly around the tire, in a manner such that the parts will be very easily attached to and removed from the tire while maintaining the parts positively interlocked together and proof against accidental unlocking during the time when the chain is in use.

The objects of this invention are fulfilled by providing the chain hook with a spring keeper of novel form, which lies flatly against the hook, the hook end being extended alongside of the keeper and being provided with a beveled surface tapering off toward the outside of the hook so as to obtain an easy engagement and disengagement of the chain link secured by the hook.

The invention will readily be understood from the following description and accompanying drawing, wherein—

Figure 1 represents a side elevation of an automobile wheel and tire equipped with a chain having its parts secured together by the fastening devices of the improved type.

Figure 2 is an enlarged side view of one of the fastening devices, showing details of its construction, and showing the manner in which the chain part is interlocked thereto.

Figure 3 is a view similar to Figure 2, showing the first step in the removal of the chain part of the fastening device.

Figure 4 is a view similar to Figure 3 but showing the chain part further removed from the device.

Figure 5 is a view similar to Figure 4, but in perspective and showing the chain about to slip from beneath the interlocking means.

Figure 6 is a fragmentary end view, partly in section, of the device of this improved type of fastening device, being taken on the line 6—6 of Figure 4.

Figure 7 is a side view of a modified form of hook, and

Figure 8 is an edge view thereof.

Referring more particularly to the drawing, it will be seen from Figure 1 that the wheel and tire have applied the chain A, which is formed in the customary manner, and having at one end affixedly secured thereto a suitable fastening member B adapted to engage the other end of the chain and interlock therewith when the chain is applied. It will be understood that there is one of such chains on each side of the wheel in the customary manner, such being interlocked by the chain sections C spaced at equal intervals around the chains A and are spaced over the tread of the tire in the usual manner.

These chain sections C are secured in place, when applied, by the fastening instrumentalities B, similar to the instrumentalities previously mentioned, and which are desirably formed of the hooks embracing the present improved features of the construction.

These hooks comprise in general a flat body portion 1 being bent at each end to the hook portions 2 and 3, these portions extending in planes at substantial right angles to each other. To attach to the chain, the hook member 2 is inserted through a desired link and permanently affixed by bending it over the link so that the link cannot slip out of engagement with the hook.

Secured adjacent the hook member 2 on the body 1 is a flat spring element 4, serving as a keeper and having an inwardly projecting end 5 which is brought into comparative close engagement with the sides of the hook 3 so as to retain a chain link D in interlocked relation with the hook portion 3 so that there will be no likelihood of accidental displacement on the uncoupling of the link D from the hook.

One of the principal features of this invention lies in the association of the spring keeper 4 with the hook device, particularly in having an edge 6 of the inwardly extending end 5 rounded, the adjacent side of the hook being bevelled at 7 to permit ready insertion and removal of the link D from engagement with the hook 3 by virtue of the cam action obtained between the link D and the cam edge 6 of the spring 4; and the bevelled edge 7 of the hook permits a sufficient manipulation of the link D so that it may be readily slipped between the cam edge 6 of the spring and the bevelled edge 7 of the hook.

It will be seen that normally the spring 4 lies flatly against the body 1, with the end 5 of the spring projecting into the hook 3 between the sides thereof. When the link D is inserted, the spring 4 yields sufficiently to allow the link to pass between the spring and hook, the spring assuming somewhat the dotted line position of Figure 6.

It will be apparent that when the link D is inserted, the end of the hook 3 is slipped into the link and sufficient pressure to overcome the resistance of the spring 4 will cause the link D to be guided between the cam edge 6 and bevelled edge 7 to lift the spring 4 sufficiently to allow the link to enter into the unobstructed area of the hook.

To release the link D, the opposite manipulations take place, the link being first brought into the position of Figure 3, when the end of the hook 3 is brought out of engagement with the link, and upon further manipulation of the link D, as will be seen from Figures 4 and 5, the link will be caused to enter between the cam edge 6 of the spring 4 and the bevelled edge 7 of the hook 3, from whence it can be readily withdrawn with a pull of sufficient strength to overcome the resistance of the spring 4.

It will therefore be apparent that the construction herein provided is one of extreme simplicity, and one which may be attached and release a chain with a minimum of effort. The spring 4 is of course of sufficient strength to obstruct any unintentional slippage of the link D between the spring edge 6 and bevelled edge 7 of the hook, the inwardly extending end 5 however serving as a keeper to retain the link in interlocked relationship with the hook until the link is properly released from engagement therewith.

In the modified form of Figures 7 and 8, parts corresponding to the previously described form are indicated by the same reference numerals. It will be seen that in this form the flat hook body 1 is attached to the side chain A by bending the end of the body around a link of the chain as clearly shown at 2a. The hook 2 receives a link D of the cross chain C and is held in place by the resilient leaf spring keeper 4, which extends entirely across the hook 2 to lock the link D in place. The keeper 4 is provided with an in-bent edge 5a which extends across the hook opening and abuts against the inner edges of the hook to serve to keep the spring in place. The keeper is also provided with an inclined edge 6a, and the hook itself is desirably provided with the inclined edge 7a to facilitate attachment of the link D.

It will be seen that this operates in a manner entirely similar to the form previously described.

Having thus described my invention, what I claim as new and desire to secure by Letters Patent of the United States, is—

1. A fastening device of the character described, comprising a body portion terminating in attaching means for permanently attaching the device to a chain link, a hook adapted to releasably interlock with a second chain link, and means for releasably securing the said second link in position on the hook, the said means comprising a spring member formed with an end extending inwardly into the area defined by the said hook and having its edge formed into a cam acting surface against which the chain link engages upon insertion and removal thereof relative to the hook, the resilient member being thereby movable out of obstructing position for allowing manipulation of the said link into and out of contact with the hook.

2. A fastening device of the character described, comprising a body having a portion thereof formed into a hook, a resilient keeper member secured to the body and having a portion thereof extending into the area defined by the hook, the said portion being formed with a cam acting edge whereby an object positioned over the hook will act to press the said keeper out of obstructing position as the object is passed between the keeper and the hook.

3. A tire chain hook comprising a body formed at its ends into hooks, one of the hooks being adapted to be permanently inserted into a link of a tire chain, the other hook being adapted to grip in a releasable interlock another link for connecting chain parts together, a flat spring keeper extending over one side of the latter hook and releasably obstructing the same, the keeper having a cammed edge engageable with the chain link when inserted over the hook or removed therefrom whereby the keeper will be lifted by the link sufficiently to allow its passage past the said keeper, the hook being bevelled at its portion adjacent the said cammed keeper edge to cooperate therewith for facilitating passage of the link between the hook and cammed edge.

4. A tire chain fastener comprising a hook member adapted to receive a chain link and a spring keeper partially obstructing the hook and having a cammed surface lying adjacent one side of the hook, the said side being bevelled to cooperate with the cammed edge in allowing lifting of the keeper by a link being passed over and removed from the hook as the link is pressed between the bevelled hook side and cammed keeper surface.

5. A tire chain fastener comprising a body portion terminating into a hook adapted to receive a chain link, and a spring keeper secured to the body portion and extending flatly alongside the hook, the keeper having a cammed surface adjacent the hook to facilitate passage of a link between the hook and keeper.

6. A tire chain fastener comprising a body portion terminating into a hook adapted to receive a chain link, and a spring keeper secured to the body portion and extending flatly alongside the end of the hook, the said end of the hook being provided with a bevelled surface tapering toward the outside of the hook, the keeper having a cammed edge adjacent the hook to facilitate passage of a link between the hook and keeper.

7. A tire chain fastener comprising a hook member, a chain link adapted to be received by said hook, and a spring keeper partially obstructing the hook and having an edge adjacent one side of the hook, the said side of the hook being formed to allow passage of the link between the keeper and the hook, the said link being releasable from the hook by a turning movement and forming, through leverage action, an actuating member for the keeper to move the keeper to allow the link member to be released.

8. A tire chain fastener comprising a hook member adapted to receive a chain link, said hook having substantially flat sides, a leaf spring keeper attached to one of the said sides and yieldable in a direction normal to the side, the said keeper being provided with an in-bent tongue abutting against the inner edges of the said hook, a removable link receivable within the hook, and means for permanently attaching one end of the hook to a link of a chain, the keeper being actuated by the removable link being inserted over and removed from the hook.

In testimony whereof I affix my signature.

OLAF ARNFIN STAM ERIKSEN.